United States Patent [19]

Makita

[11] Patent Number: 5,017,796
[45] Date of Patent: May 21, 1991

[54] MOVING BLADE TIP CLEARANCE MEASUREMENT APPARATUS AND METHOD WITH MOVEABLE LENS

[75] Inventor: Haruomi Makita, Nagoya, Japan

[73] Assignee: Mitsubishi Jukogyo Kabushiki Kaisha, Tokyo, Japan

[21] Appl. No.: 446,867

[22] Filed: Dec. 6, 1989

[30] Foreign Application Priority Data

Jan. 11, 1989 [JP] Japan .................................. 1-4420

[51] Int. Cl.$^5$ ............................................. G01N 21/86
[52] U.S. Cl. ...................................... 250/561; 356/375; 250/201.4; 350/255
[58] Field of Search ........................... 356/375, 376, 4; 250/561, 560, 201.4, 201.5, 227.21, 227.11, 201.3; 350/255, 253

[56] References Cited

U.S. PATENT DOCUMENTS

| | | | |
|---|---|---|---|
| 3,704,657 | 12/1972 | Sliwkowski et al. | 350/255 |
| 4,153,341 | 5/1979 | Kawamura et al. | 350/255 |
| 4,326,804 | 4/1982 | Mossey | 250/561 |
| 4,336,997 | 6/1982 | Röss et al. | 250/201.3 |
| 4,349,244 | 9/1982 | Hellriegel | 350/255 |
| 4,674,882 | 6/1987 | Dorman et al. | 356/375 |
| 4,679,905 | 7/1987 | Westover | 350/255 |
| 4,743,771 | 5/1988 | Sacks et al. | 250/560 |
| 4,797,545 | 1/1989 | Shikama et al. | 250/201.5 |
| 4,800,286 | 1/1989 | Brears | 250/560 |
| 4,845,556 | 7/1989 | Somers et al. | 356/375 |

OTHER PUBLICATIONS

Transactions of the ASME/Journal of Engineering for Power, Apr. 1981, vol. 103, pp. 457–460.

Primary Examiner—David C. Nelms
Assistant Examiner—Michael Messinger
Attorney, Agent, or Firm—Fleit, Jacobson, Cohn, Price, Holman & Stern

[57] ABSTRACT

A laser-optical apparatus for measuring blade tip clearance, e.g. of a compressor or gas turbine, uses a laser beam, fiber optics, a light probe and electrical circuits (14, 25) for processing data from the probe, and includes a light probe (16) having a lens (17) for making parallel a light beam from the optical fiber cable (15) for illumination, a half-mirror (18) for separating illuminating light and reflected light, a movable lens (19) for adjusting focus of the light beam on the object (12), an object lens (21), and a lens (22) for collected reflected light from half-mirror (18) and directing it to an entrance to the optical fiber cable (24) which transmits received light to the light reception circuit (25). The method for measuring blade tip clearance includes focusing a parallel light beam from a laser source (14, 15) through a half-mirror (18), adjustable lens (19) and object lens (21) onto an object (12), adjusting the focus by oscillating movement of the adjustable lens, detecting the reflected light received, and determining the tip clearance from the position of the adjustable lens at the time the reflected light is at a maximum value.

8 Claims, 3 Drawing Sheets

MOVING BLADE TIP CLEARANCE MEASUREMENT APPARATUS AND METHOD WITH MOVEABLE LENS

BACKGROUND OF THE INVENTION

The present invention relates to a measurement apparatus and a method which are applicable to blade tip clearance measurements of blades actually rotating in aircraft jet engine compressors or turbines. The present invention is also applicable to blade tip clearance measurements in gas turbines for power generation, gas turbines for automobiles and other vehicles, and other industrial turbo mechanisms.

FIG. 1 shows a conventional apparatus (see, for example, Barranger, J. P. and Ford, M. J., Journal of Engineering for Power, April. 1981, Vol. 103, pp. 457 -460). In the conventional laser-optical clearance measurement apparatus shown in FIG. 1, a laser beam generated at a laser generator 1 is led to an optical tube 3 via an optical fiber cable 2 for illumination and goes through a prism 4 and is reflected at the tip of a moving blade 5. The reflected light goes through the prism 4 again and enters an image processor 7 via an optical fiber cable 6 for receiving the reflected beam. Changes in the moving blade tip position are displayed on the image processor as the shift of the received beam to a position indicated by a broken line in this figure.

The conventional apparatus has the following problems: (1) Since the prism is located close to major gas flow, combustion products in this flow tend to attach to it; (2) Because the cable for receiving the reflected light beam has to be a bundle of several million fibers so that the position of the beam is captured as an image, it is breakable and expensive; and (3) The image processor contains an image intensifier which is, beng a vacuum tube, susceptible to vibrations and shocks and also expensive. Therefore, although these apparatuses can be used for short testing on the ground, at present they cannot practically be attached to working engines and used for their feedback control. Furthermore, there exist some space problems with large tube diameters associated with the asymmetry of the optical system around its optical axis.

BRIEF SUMMARY OF THE INVENTION

It is an object of the present invention to provide a clearance measurement apparatus which solves the above problems.

This invention provides a blade tip clearance measurement apparatus which comprises an optical fiber cable for a light beam used for illumination, a light probe, an optical fiber cable for received light, and a light reception circuit. The apparatus of this invention is characterized in that the light probe comprises a lens for making parallel an illumination light beam from the optical fiber cable for illuminating light, a half-mirror for separating illuminating light and reflected light, a movable lens for adjusting focus, an object lens, and a lens for collecting light at the entrance to the optical fiber cable for received light.

While conventional optical (laser type) blade tip clearance measurement apparatuses use the principle of triangulation, the blade tip clearance measurement apparatus of the present invention is based on the fact that the output from a light receptive element is maximum when the light beam from the movable lens focuses on the blade tip. This makes it unnecessary to place a prism near a major gas flow. Since only one light receptive element is required, one fiber suffices in the optical cable for received light. Also, an image processor and an image intensifier become unnecessary. Furthermore, because the main optical system is composed of a group of lenses arranged in a symmetric manner with respect to its axis, the diameter of the optical tube can be smaller.

This invention also provides a method for measuring blade tip clearances using the above measurement apparatus of the invention which is characterized by the steps of shifting periodically the movable lens for adjusting focus so that at a certain point of this oscillation the illuminating light beam is focused onto a blade tip, and measuring the blade tip clearance by putting together a function of position of the movable lens, which is in turn a function of the clearance to be measured, and scattered peak values in the output from the light reception circuit.

BRIEF DESCRIPTION OF THE DRAWINGS

This invention will now be described in detail with reference to the accompanying drawings wherein.

DETAILED DESCRIPTION OF PREFERRED EMBODIMENT

Figure 1:
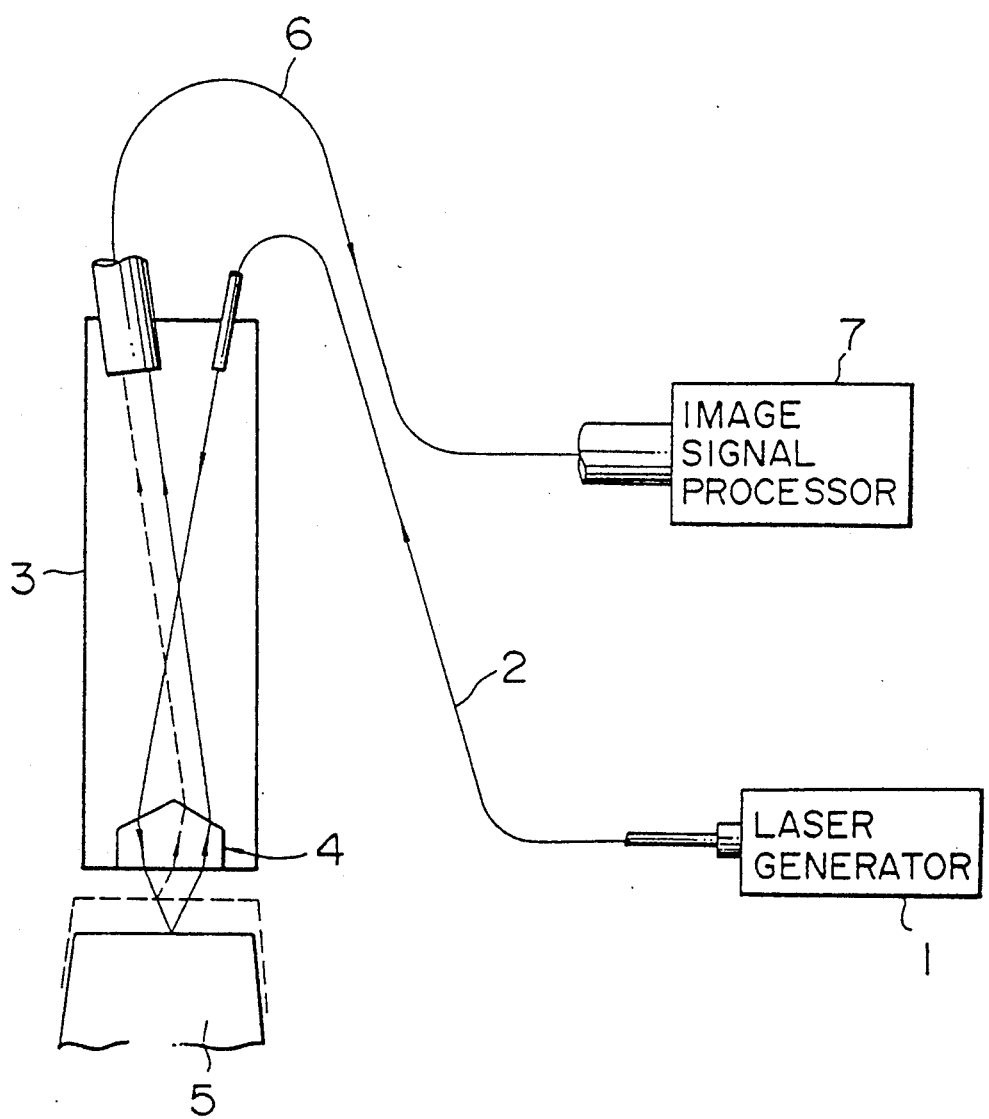
FIG. 1 is a schematic view which shows an example of prior art.
Figure 2:
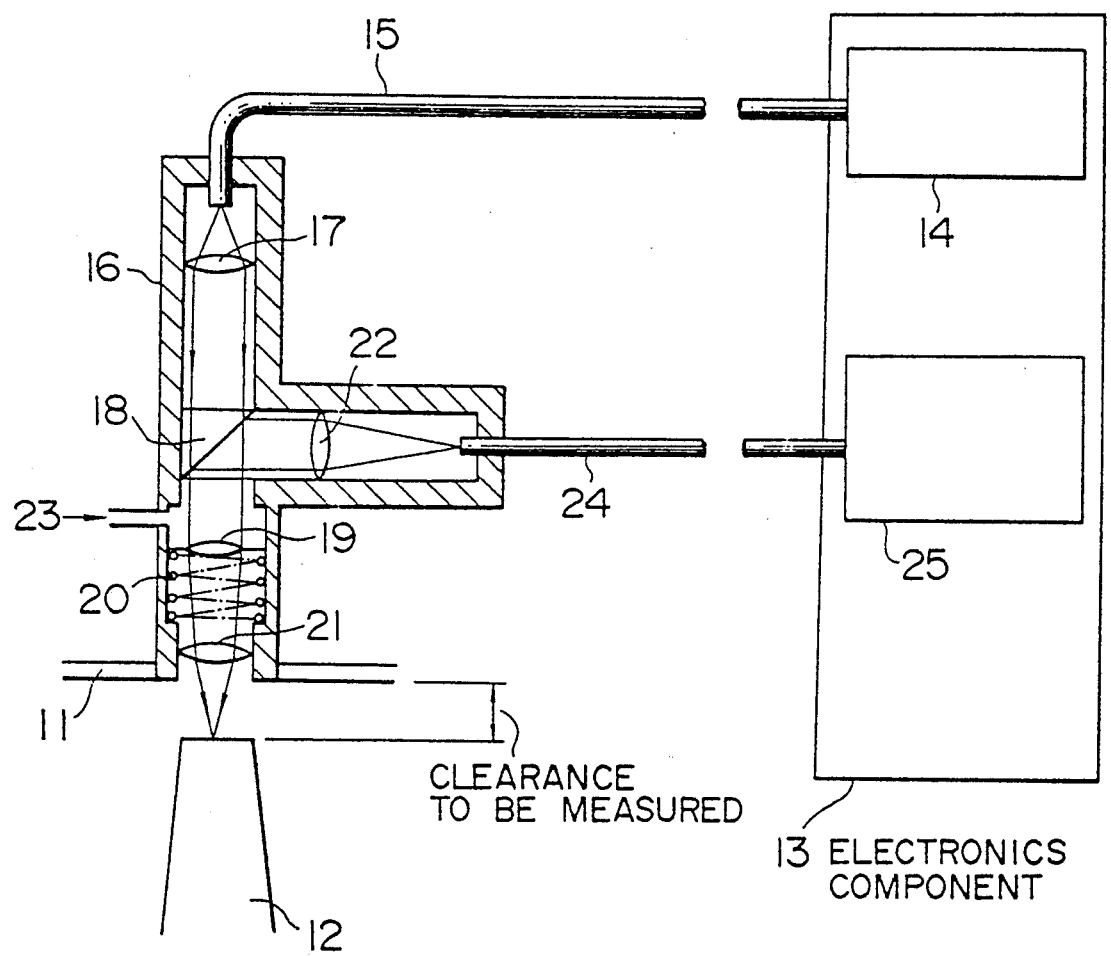
FIG. 2 is a schematic cross-sectional view which shows an embodiment of the present invention.

FIGS. 2 and 3 show an embodiment of the present invention.

FIG. 2 shows an example of the structure of the clearance measurement apparatus of the invention. In FIG. 2, the numeral 16 indicates the main body of a light probe attached to a casing 11 which becomes hot. This light probe measures the clearance between a moving blade 12 and the casing 11. An electronics component 13 houses an illumination circuit 14 and a light receptive circuit 25 and keeps electronic parts in an environment near room temperature. The main body of the light probe 16 and the electronics component 13 are connected by an optical single-fiber cable 15 for illumination and an optical single-fiber cable 24 for received light. The main body of the light probe 16 can be devided into two systems: an illumination system which comprises a lens 17 for making parallel a light beam from the optical fiber cable 15 for illumination, a half-mirror 18 for separating illuminating light and received light, a movable lens 19 for adjusting focus, a spring 20 holding this movable lens and an object lens for making an illumination light spot on the rotating tip of the moving blade, and a light reception system which comprises the object lens 21, which is also used for collecting light reflected by the tip of the moving blade, the movable lens 19, the half-mirror 18 and a lens 22 for focusing reflected light at an entrance to the optical fiber cable 24 for received light.

Next, the operation of the clearance measurement apparatus of the invention will be explained. Light is sent into the optical fiber cable 15 from the electronic component 13 and comes out at the end of the cable 15 in the light probe 16. The diameter of the cable 15 is small enough to be considered as a point source. The out-coming light is shaped into a parallel beam by the lens 17. After passing through the half-mirror 18, it is focused to a light beam spot on the tip of the moving blade 12 by the object lens 21. The movable lens 19 is supported by the spring 20 and shifts its position periodically with the periodic variation, or oscillation, of pressurized air 23. Accordingly, the focal length of the group of lenses 19, 21 varies periodically. The light focused on the blade tip is reflected and goes through the lenses 21, 19, and then it is separated by the half-mirror 18 and bent by 90° with respect to the axis of the illumination optical system. Then, the light is gathered at around an entrance to the receiving optical fiber cable 24 by a lens 22. Because the diameter of the optical fiber 24 is sufficiently small, the amount of light takes a sharp peak value at the moment when the light beam focuses on the tip of a moving blade 12. Therefore, the output from the light reception circuit also takes a peak value, and the clearance can be known easily by measuring the pressure of the pressurized air 23 because the focal length of the group of lenses 19, 21 is a function of the position of the lens 19, i.e., a function of this pressure.

Now, if we denote the focal lengths of lenses 19 and 21 as $f_1$ and $f_2$, respectively, and if the distance between the lenses is x, the focal length of the group of these lenses f becomes $$1/f = 1/f_1 + 1/f_2 - x/f_1 f_2.$$

Therefore, $$df/dx = f_1 f_2/(f_1 + f_2 - x)^2.$$

Also, if we denote the spring constant of the spring 20 as k and the pressure of the pressurized air 23 as p, then since dp/dx=k, the relation between f and p can be expressed by:

$$df/dp = k^{-1} f_1 f_2/(f_1 + f_2 - x)^2.$$

Figures 3A, 3B, 3C:
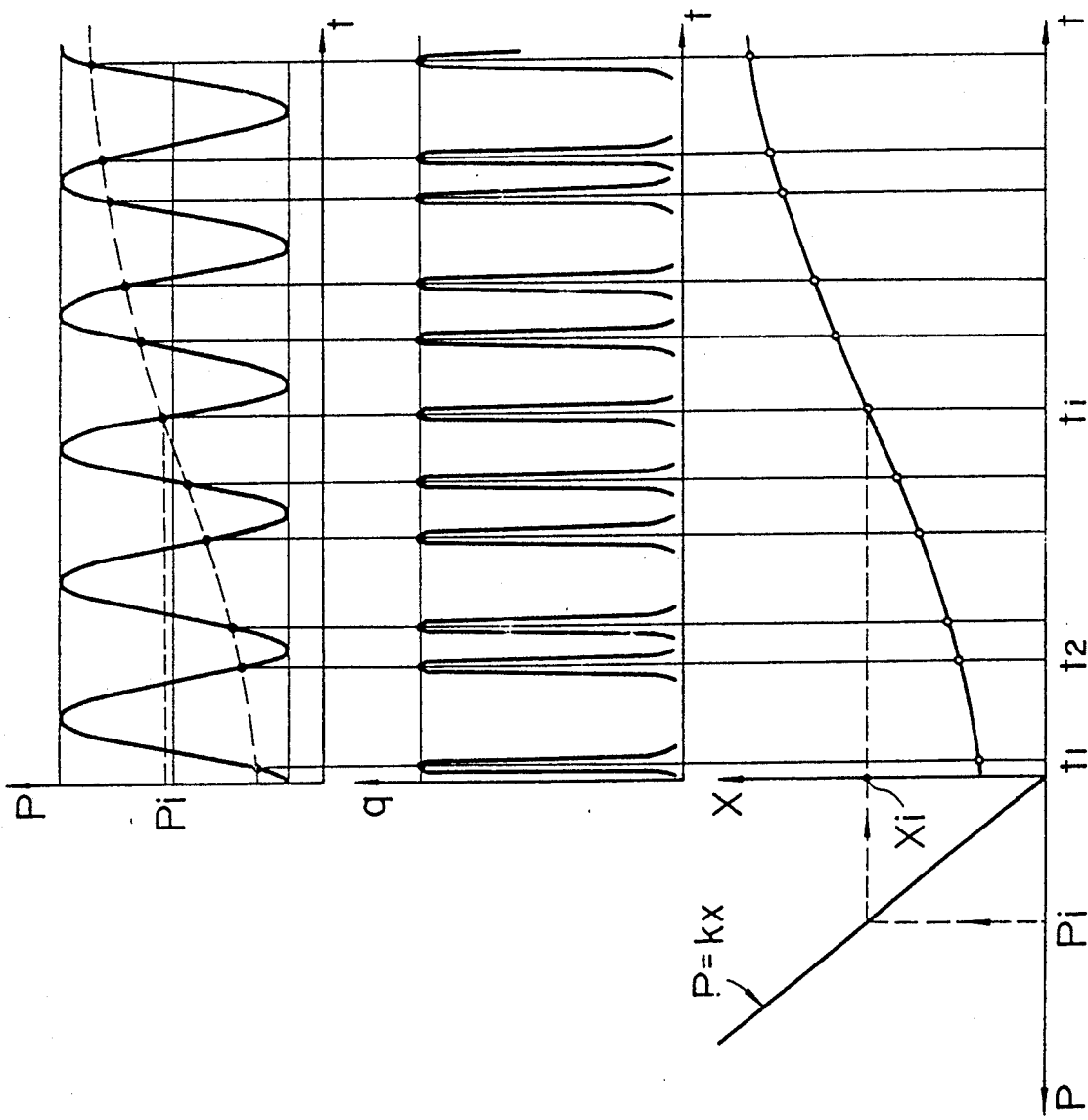
FIGS. 3a, 3b, and 3c are diagrammatic illustrations which shows the operational principle of the embodiment of the present invention.

FIG. 3 shows the principle of operation of the embodiment of this invention. FIG. 3(a) shows an example of periodic variation of the pressure p of the pressurized air, where t signifies time. FIG. 3(b) shows an expected variation pattern in the output q corresponding to the amount of received light, and a peak value is reached every time the beam spot is focused on the tip of a moving blade. For example, if q is maximum at time $t_i$ and the pressure of the pressurized air is $p_i$ at this moment, the distance between the lenses, i.e., the clearance to be measured ($x=x_i$), can be obtained from the relation p=kx in FIG. 3(c). FIG. 3(c) shows how scattered values for the clearance x are obtained as it varies in time. With this method for measuring blade tip clearance, it becomes possible to easily extract a large amount of information about the clearance by examining scattered output peak values from the light reception circuit in detail.

Here, it should be noted that the variable focusing mechanism comprising the combination of the moveable lens, the spring and the pressurized air, and the measurement method of a focal length through measuring the pressure is shown only as an example in the above embodiment. This embodiment therefore is in all respects illustrative and by no means restrictive in considering the scope of the invention.

The following effects are achieved by the construction of the laser-optical blade clearance measurement apparatus of the present invention as described above:

(1) By placing the object lens 21 away from the major gas stream in turbo mechanisms, the attachment of undesirable material can be diminished.

(2) By employing a brightness judgement, or light intensity circuit with adjustable focusing in the light probe and reception systems, the optical fiber used in the invention can be a single fiber, and an image intensifier becomes unnecessary resulting in greatly improved reliability, durability and cost effectiveness. This also makes it possible to make the apparatus more compact.

Furthermore, according to the method of the present invention, the potential of the above apparatus of this invention may be exploited fully, but this apparatus can also be operated based on the similar operational procedure. The embodiment shown here is not restrictive in this respect.

I claim:

1. A moving blade tip clearance measuring apparatus comprising:
   an optical fiber cable for transmitting illuminating light;
   a light probe connected to said optical fiber cable for receiving illuminating light therefrom;
   a lens mounted in said light probe for receiving said illuminating light and directing a parallel illuminating light beam toward moving blades;
   a half-mirror mounted in said probe for receiving and transmitting therethrough said illuminating light beam and receiving and reflecting light reflected from the moving blades at an angle to said illuminating light beam to separate said reflected light from said illuminating light beam;
   an object lens mounted in said probe for receiving said illuminating light beam from said half-mirror and directing said illuminating light beam onto the moving blades, and receiving reflected light from said blades and directing said reflected light toward said half-mirror;
   a movable lens means mounted in said probe between said half-mirror and said object lens for changing the focus of said illuminating light beam on said blades and receiving said reflecting light from said object lens;
   means for moving said movable lens means to periodically change said focus;
   a receiving optical fiber cable connected to said probe for receiving and transmitting said reflected light from said probe; and
   a reflection receiving lens mounted in said probe for receiving and directing said reflected light onto said receiving optical fiber cable.

2. Measuring apparatus as claimed in claim 1 wherein:
   said movable lens means comprises spring means mounted in said probe and a focus adjusting lens mounted on said spring means; and
   said means for moving said movable lens comprises pneumatic pressure means operatively connected to said probe for applying pressure against the force of said spring means to vary the position of said focus adjusting lens between said half-mirror and said object lens.

3. Measuring apparatus as claimed in claim 1 and further comprising:
   light reception circuit means operatively connected to said receiving optical fiber cable for receiving reflected light therefrom and emitting an output varying with the intensity of reflected light, so that said output is a maximum when the reflected light is a maximum at the time the illuminating light beam is focused on the tip of a blade.

4. Measuring apparatus as claimed in claim 2 and further comprising:

light reception circuit means operatively connected to said receiving optical fiber cable for receiving reflected light therefrom and emitting an output varying with the intensity of reflected light, so that said output is a maximum when the reflected light is a maximum at the time the illuminating light beam is focused on the tip of a blade.

5. Measuring apparatus as claimed in claim 2 wherein:
said pneumatic pressure means comprises an oscillating pneumatic pressure means.

6. Measuring apparatus as claimed in claim 4 wherein:
said pneumatic pressure means comprises an oscillating pneumatic pressure means.

7. Method for measuring the tip clearance of moving blades comprising:

providing an illuminating light source from an optical fiber cable to a light probe;

receiving said illuminating light by a lens in said probe and directing a parallel illuminating light beam from said lens toward a half-mirror in said probe;

transmitting said parallel illuminating light beam through said half-mirror;

receiving said illuminating light beam by a moving lens and an object lens in said probe and directing said light beam by said object lens toward moving blades;

receiving reflected light from said blades by said object lens and said moving lens;

receiving said reflected light from said moving lens by said half-mirror;

separating said reflected light from said illuminating light beam by said half-mirror and directing said reflected light therefrom at an angle to said illuminating light beam;

receiving said reflected light beam from said half-mirror by a reflection receiving lens in said probe;

directing said reflected light from said reflection receiving lens to a reflected light optical fiber cable;

receiving said reflected light by a light receiving circuit optically connected with said probe through said reflected light optical fiber cable;

adjusting the focus of said illuminating light beam on said moving blades by moving said moving lens periodically so that at certain times during said movement of said movable lens said illuminating light beam is focused onto blade tips whereby said reflected light becomes maximum;

producing an output from said light receiving circuit in response to said reflected light, said output varying with varying intensity of said reflected light and being maximum when said reflected light is maximum; and determining the blade tip clearance by determining the position of said moving lens at the time of said maximum output.

8. Method for measuring the tip clearance of moving blades as claimed in claim 4 wherein:

said periodic movement of said moving lens comprises applying oscillating pneumatic pressure to said probe to oscillate said moving lens; and said determining said position of said moving lens comprises measuring said pneumatic pressure.

* * * * *